(12) United States Patent
Arsenault

(10) Patent No.: US 8,364,545 B2
(45) Date of Patent: Jan. 29, 2013

(54) SYSTEM AND METHOD FOR PAIRING FOOD WITH WINE

(75) Inventor: Eric S. Arsenault, Ann Arbor, MI (US)

(73) Assignee: Interactive Menu Technologies, LLC, Ann Arbor, MI (US)

( * ) Notice: Subject to any disclaimer, the term of this patent is extended or adjusted under 35 U.S.C. 154(b) by 0 days.

(21) Appl. No.: 13/114,449

(22) Filed: May 24, 2011

(65) Prior Publication Data

US 2012/0303470 A1 Nov. 29, 2012

(51) Int. Cl.
*G06Q 50/00* (2012.01)
*G06Q 30/00* (2012.01)
*G06Q 20/00* (2012.01)

(52) U.S. Cl. ............... 705/16; 705/15; 705/23
(58) Field of Classification Search ............. 705/15, 705/16, 23
See application file for complete search history.

(56) References Cited

U.S. PATENT DOCUMENTS

| | | | |
|---|---|---|---|
| 7,881,960 B2* | 2/2011 | Ramamurti | 705/7.35 |
| 2001/0025279 A1 | 9/2001 | Krulak et al. | |
| 2002/0111899 A1* | 8/2002 | Veltre et al. | 705/37 |
| 2003/0097357 A1* | 5/2003 | Ferrari et al. | 707/3 |
| 2003/0216970 A1* | 11/2003 | Vadjinia | 705/26 |
| 2004/0181445 A1* | 9/2004 | Kolsky et al. | 705/10 |
| 2005/0004980 A1* | 1/2005 | Vadjinia | 709/203 |
| 2005/0055281 A1* | 3/2005 | Williams | 705/26 |
| 2006/0085292 A1* | 4/2006 | Lafay | 705/28 |
| 2006/0112108 A1* | 5/2006 | Eklund et al. | 707/100 |
| 2006/0179055 A1* | 8/2006 | Grinsfelder et al. | 707/6 |
| 2008/0133318 A1* | 6/2008 | Ramamurti | 705/10 |
| 2008/0275761 A1* | 11/2008 | Seifer et al. | 705/10 |
| 2009/0029326 A1* | 1/2009 | Kark et al. | 434/127 |
| 2009/0210321 A1 | 8/2009 | Rapp | |
| 2010/0017219 A1* | 1/2010 | Busch | 705/1 |
| 2011/0138305 A1* | 6/2011 | Akai et al. | 715/753 |
| 2011/0157226 A1* | 6/2011 | Ptucha et al. | 345/638 |
| 2011/0208617 A1* | 8/2011 | Weiland | 705/27.1 |
| 2011/0238520 A1* | 9/2011 | Selley | 705/26.3 |
| 2011/0301446 A1* | 12/2011 | Kamen | 600/365 |
| 2012/0136864 A1* | 5/2012 | Ochtel | 707/738 |

OTHER PUBLICATIONS

Pair It!—Food and Wine Guide Specification, Release Date of version 1.1, May 13, 2010, see print out pp. 1-19, retrieved from internet on Jan. 10, 2012 (hereinafter "PAIR IT!").*

Locke, Micheal (Jul. 25, 2009). Sommelier software program recommends pairings. Associated Press.*

The Wine Curators, The Personal Wine Curator 3.0 (Apr. 20, 2009). Retrieved from the wayback machine, at http://web.archive.org/web/20090420075600/http://www.thewinecurators.com/PWCmain.shtml.*

(Continued)

*Primary Examiner* — Elaine Gort
*Assistant Examiner* — Peter L Ludwig
(74) *Attorney, Agent, or Firm* — Quinn Law Group, PLLC

(57) ABSTRACT

A system for pairing food from a food menu with wine from a wine menu includes a host machine and computing device (s). A method uses the host machine and computing device (s) to conduct the pairing. The host machine has first and second databases describing, via objectively scored categories, each food item in the food menu and each wine in the wine menu. Each device is in communication with the host machine. The computing device receives a food selection signal corresponding to a food item(s) in the food menu, and calculates, for each wine, solutions to comparison functions which compare different numerically-scored categories for the food and wine. A numeric Pairing Compatibility Score (PCS) value is calculated for each wine as a function of the solutions, and rank-ordering is conducted on the PCS values. Wines with a threshold PCS value(s), e.g., lowest value(s), are displayed as recommended pairings.

18 Claims, 2 Drawing Sheets

OTHER PUBLICATIONS

Food and Wine Pairing: Vino Match; It's a matter of taste. WindowsPhone.*
WineToMatch (Released May 23, 2010). Foor & Wine pairing app for iOS and Android Phones.*
Nat Decatnts Free Mobile App (Mar. 29, 2011). From www.nataliemaclean.com.*
iTunes Preview of Nat Decants Wine Reviews, Pairings, Recipes (Sep. 8, 2010).*
Delicious Wine Recipes, by Natalie MacLean, with raitings (undated).*
Berry, M. (2009). 5 Must-Have iPhone Apps for Wine Lovers. mashable.com.*

* cited by examiner

SYSTEM AND METHOD FOR PAIRING FOOD WITH WINE

TECHNICAL FIELD

The present disclosure relates to a system and method for pairing food with wine using a numeric score-based computational approach.

BACKGROUND

Wine has been prominently featured on dinner tables throughout history. Today, wines of exceptional quality are readily available for purchase and consumption both at the point of sale as well as in the home. The tremendous variety of wines available in the modern marketplace can be somewhat overwhelming even to the most experienced of wine consumers. For instance, one may choose from a number of different varietals such as Pinot Grigio, Chardonnay, Cabernet Sauvignon, and Malbec. Within each varietal exists a vast array of flavors, each of which can uniquely interact with food on the palette in a host of different and often unpredictable ways.

For this reason, finer restaurants may offer the services of a professional sommelier to better assist their patrons in making appropriate wine selections. A professional sommelier may be employed to help build a quality wine selection, to procure the various wines from a supplier, and/or to manage the storage, climate control, and cycling of the wines. Use of a sommelier allows some establishments to provide a premium level of service to their patrons, including helping their patrons intelligently select a wine that, in the best estimation of the sommelier, nicely complements their particular food selections.

However, the services of a professional sommelier can be relatively expensive. This in turn can limit employment of a full-time sommelier to select higher end establishments able to afford such services, often by passing the costs along to the consumer in the form of higher menu prices. Additionally, the recommendations of different sommeliers may be highly variable with respect to the same wine and food items. Moreover, the personal biases, taste preference, and other human limits of a given sommelier can lead to undesired recommendations for the consumer.

SUMMARY

A system is disclosed herein for pairing a particular food item or courses of different food items with wine. The system includes a host machine and one or more networked computing devices. In one embodiment, the host machine may be a server and the various computing devices may be interactive touch-screen tablet computers. In another embodiment, the host machine may be one of the computing devices. The host machine includes or has access to a data base management system (DBMS) having first and second databases.

The first database describes all of the items offered for sale by a user or a user's establishment, such as a food menu of available appetizers, salads, soups, entrees, sandwiches, and desserts. Each menu item is described using a plurality of numerically-scored categories. The second database similarly describes all of the wines offered for sale in the establishment's current wine menu, i.e., via a different plurality of similarly scored categories. The host machine receives configuration signals from a designated administrator, for instance a sommelier, manager, or other person having restricted access to the host machine, to populate the databases and update the databases as needed.

As an illustrative example, a dining patron, upon sitting down to order from an interactive or conventional food menu, may be presented with a tablet computer. Upon recording their desired food selections by touching a touch-screen of the tablet computer, a central processing unit (CPU) of the tablet computer executes code from memory. Execution of the code causes the CPU to calculate a numeric bin number score, hereinafter referred to as a Pairing Compatibility Score, i.e., a PCS value. The user is thereafter presented with an image and/or text describing the recommended wine pairing or pairings which have the lowest PCS value(s), e.g., the lowest three PCS values in one example embodiment.

In particular, a system is disclosed for pairing food from a food menu with wine from a wine menu. The system includes a host machine and one or more computing devices, e.g., the tablet computers noted above. The host machine has a first database describing, via a first plurality of numerically-scored categories, each of a plurality of different food items in a food menu. The host machine includes a second database describing, via a second plurality of numerically-scored categories, each of a plurality of different wines in a wine menu. The host machine is configured to receive a set of configuration signals from an administrator for populating the first and second databases.

Each computing device receives a food selection signal from a corresponding user, with the food selection signal corresponding to at least one food item in the food menu. The computing device is configured for calculating, for each wine in the wine menu, a set of solutions to a plurality of comparison functions, each of which compares one of the first plurality of numerically-scored categories for the at least one food item to one of the second plurality of numerically-scored categories for that particular wine. The computing device calculates a numeric PCS value for each wine in the wine list as a function of the set of solutions, rank orders the PCS values, and displays, via the display screen, one or more recommended wines from the wine menu having a predetermined threshold score, e.g., the lowest PCS value(s).

A method for pairing food from a food menu with wine from a wine menu includes populating a database management system (DBMS) with a first plurality of numerically-scored categories for each food item in the food menu. The method includes populating a second plurality of numerically-scored categories for each wine in the wine menu, and then receiving a set of configuration signals from an administrator for modifying the scores for the first and second plurality of numerically-scored categories.

The method further includes placing a computing device in wireless networked communication with a host machine such that the first and second plurality of numerically-scored categories are provided on the computing device, and receiving a food selection signal via the computing device which corresponds to at least one food item in the food menu. The method then includes calculating, via the computing device, for each wine in the wine menu and without communicating with the host machine after receiving the food selection signal, a set of solutions to a plurality of comparison functions. Each function compares one of the first plurality of numerically-scored categories for the at least one food item to one of the second plurality of numerically-scored categories for that particular wine.

Additionally, the method includes calculating a numeric PCS value for each wine in the wine list as a function of the set of solutions, rank-ordering the PCS values and displaying, via the display screen, the wine or wines from the wine menu having a threshold PCS valve, e.g., the lowest PCS value or values.

The above features and advantages and other features and advantages of the present invention are readily apparent from the following detailed description of the best modes for carrying out the invention when taken in connection with the accompanying drawings.

DESCRIPTION

Figure 1:
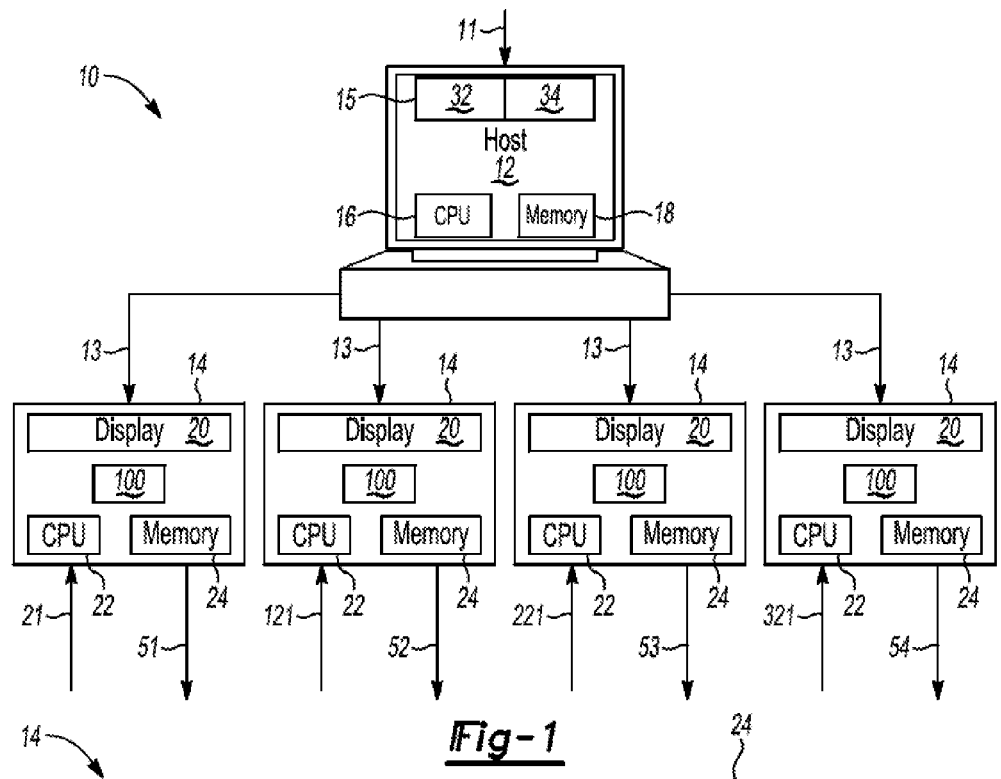
FIG. 1 is a schematic block diagram illustration of a system for pairing food with wine as set forth herein.

Referring to the drawings, wherein like reference numbers correspond to like or similar components throughout the several figures, FIG. 1 shows a schematic system 10 configured for pairing food from a food menu with wine from a wine menu. The system 10 may be used in a variety of environments, the most common example being a restaurant or other establishment which serves food and wine in sufficient variety to develop a menu to facilitate ordering.

As explained in detail below, upon selection of a food item or course of items from the food menu, the present system 10 automatically calculates a bin number score for each wine in the wine menu relative to that food item or course of items. For descriptive clarity, this score is described herein after as the Pairing Compatibility Score or PCS value. The calculated PCS values for the various wines are rank ordered, e.g., lowest score being the best match, and are used to recommend a wine from the wine menu in a wine/food pairing, doing so using closely controlled numerically-scored categories. In this manner, use of the present system 10 enables an establishment to provide intelligent wine and food pairing recommendations, with or without the services of a professional sommelier, with objective consistency and infinite repeatability of results.

The system 10 may include a host machine 12 in networked communication with a plurality of computing devices 14, e.g., interactive touch-screen tablet computers. The host machine 12 includes a data base management system (DBMS) 15. Each of the computing devices 14 may receive information (arrows 13) from the DBMS 15 to thereby replicate or copy the information in the DBMS 15 into memory 24 of each device 14 whenever the DBMS 15 is populated or subsequently updated by a designated user.

While a server/client approach is described hereinafter for illustrative clarity, one of ordinary skill in the art will appreciate that functionality of the host machine 12 may be provided via one of the computing devices 14. In other words, any one of the networked computing devices 14 may be logged into by an administrator such that the particular computing device 14 acts as the host computer 12 only as long as the administrator remains logged in, with any changes made to the DBMS 15 via the computing device 14 acting as the host machine 12 thereafter propagating to all of the other computing devices 14 in the same manner, as set forth herein.

Such an update may occur via entry and recording of configuration signals (arrow 11) which modify the content of the DBMS 15. In this manner, changes made by a designated administrator of the host machine 12 to the DBMS 15 are automatically propagated to all of the networked computing devices 14, thus enabling closely supervised control of the content of the DBMS 15. For instance, a restaurant may allow the configuration signals (arrow 11) to be input to the DBMS 15 only by a professional sommelier, a manager, or another designated/access-controlled person. This in turn may enable part-time employment of a sommelier to select and score the wines in the DBMS 15, with the day-to-day wine and food pairing recommendations being performed by the patrons themselves.

The host machine 12 and each of the networked computing devices 14 may be configured as digital computers having respective microprocessors or central processing units (CPUs) 16 and 22, as well as sufficient read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Process instructions may be stored in memory 18 and/or 24 and executed by the CPU 16 and/or 22 to provide the specific functionality described below.

Each computing device 14 shown in FIG. 1 executes computer-executable code or instructions recorded on tangible, non-transitory memory 24. The instructions embody a method 100 for objectively pairing a particular food item, course, or order/sequence of courses in a given dining experience, which is recorded in a first database 32 in the DBMS 15, with a wine or wines from a second database 34 in the same DBMS 15.

The items recorded in the first and second databases 32 and 34, respectively, each have a plurality of numerically-scored categories selected and scored by the designed user via the host machine 12. This may be accomplished using the configuration signals (arrow 11) as entered by a designated administrator. Once recorded in the DBMS 15, the values for each of the numerically-scored categories are propagated downward to each of the networked computing devices 14 as noted above, in a manner which is seamless and transparent to the patrons. The categories themselves and an example method for calculating the PCS values are set forth below in further detail with reference to FIGS. 2 and 3.

In an illustrative scenario, a dining patron, upon sitting down to order, may be presented with one of the computing devices 14. For instance, a waiter may hand over a tablet computer or another suitable device having a touch-type display screen 20. An interactive menu of all available appetizers, soups, sandwiches, entrees, and desserts may be accessed via the computing device 14 and presented via the display screen 20, with the image represented by box 25 in FIG. 2. Alternatively, the food menu information may be a simple text menu, with the supporting images and description provided using a conventional menu, a specials board, or even a waiter's verbal food recommendation.

Regardless of how the menu items and dining course sequence is ultimately determined, a user enters their menu selections via the computing device 14. As shown in FIG. 1, four example computing devices 14 are used. More or fewer computing devices 14 may be used depending on the size of the establishment and/or the number of diners consuming wine. In this non-limiting example, patrons at four different tables can select four different course selections, as represented by arrows 21, 121, 221, and 321, respectively. The computing devices 14 each receive and record the corresponding selections (arrows 21, 121, 221, or 321) in corresponding memory 24. In other words, a patron using one computing device 14 records their selections (arrow 21) in the memory 24 of that particular computing device 14. The other patrons do the same with respect to their assigned computing devices 14.

Figure 3:
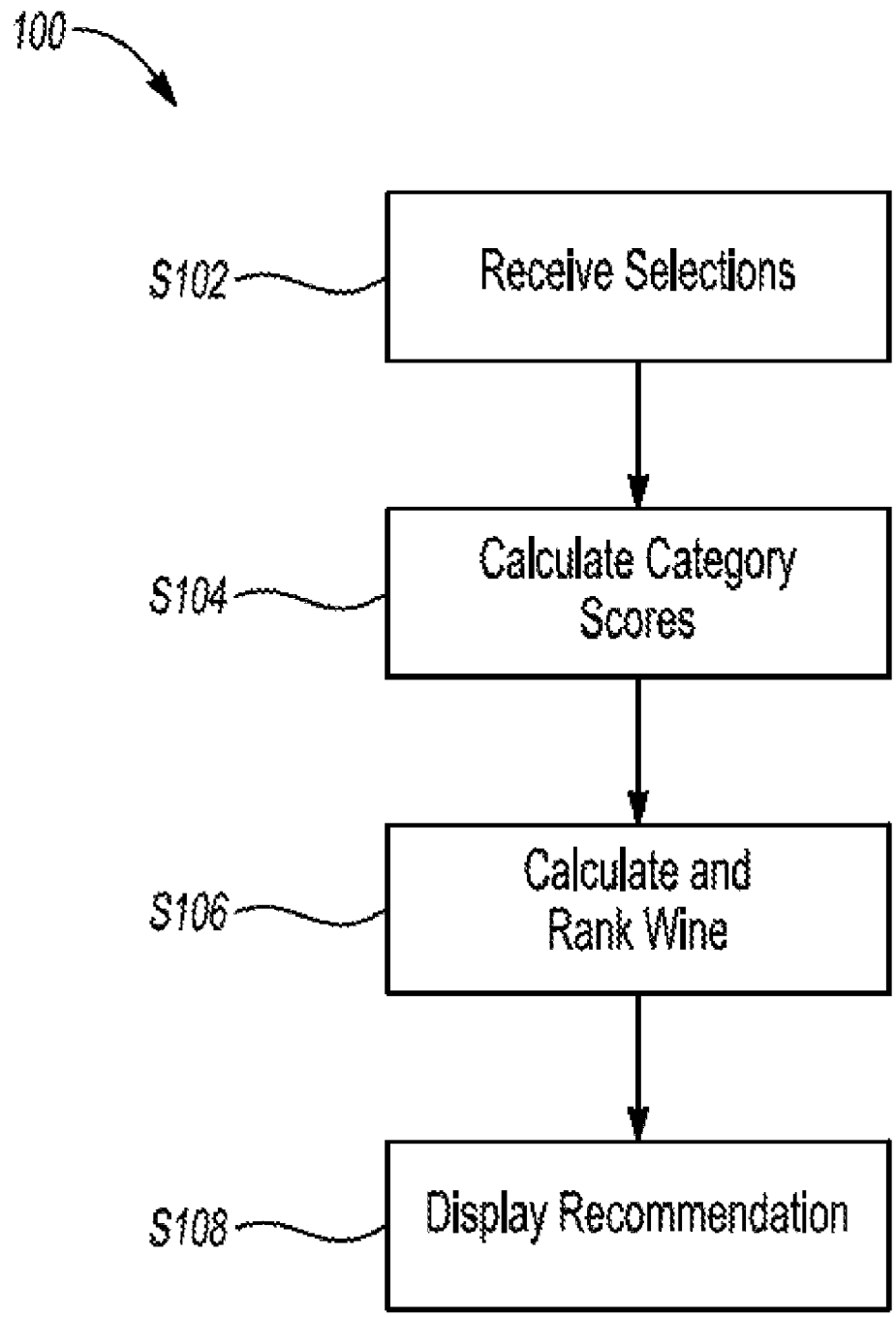
FIG. 3 is a flow chart describing an example computer-based method for pairing food with wine using the computing device shown in FIG. 2.

Upon recording the selections (arrows 21, 121, 221, or 321), a corresponding CPU 22 of the computing device 14 executes computer-executable code from memory 24 to thereby execute the present method 100, an example of which is shown in FIG. 3 and described below. In general, recording of the selections (arrows 21, 121, 221, 321) triggers access to the second database 34 within the computing device 14 used by that particular patron. The CPU 22 objectively calculates the Pairing Compatibility Score (PCS) value for each wine in the second database 34 with respect to the selections (arrows 21, 121, 221, or 321), as represented by the arrows 51, 52, 53, and 54 in FIG. 1, using the scoring data previously recorded via the configuration data (arrow 11).

Figure 2:
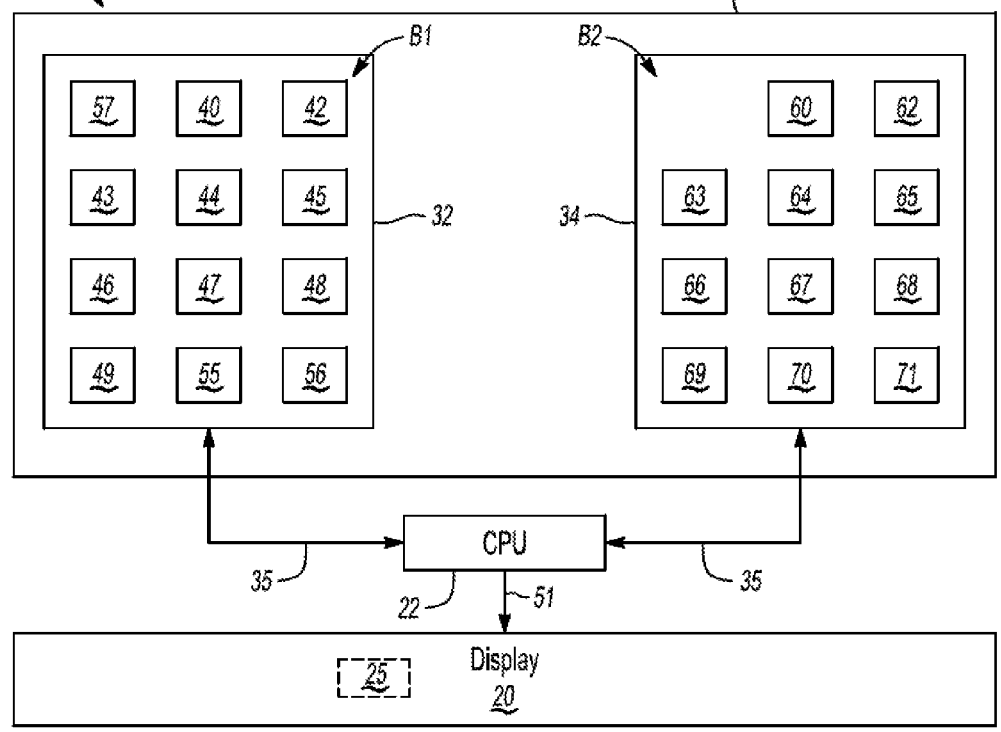
FIG. 2 is a schematic illustration of an example computing device usable within the system shown in FIG. 1.

Referring to FIG. 2, an example computing device 14 includes the first database 32 and the second database 34. The databases 32 and 34 are updated as needed, for instance via the host machine 12 of FIG. 1 as noted above, or via one of the computing devices 14 having substantially the same structure and functionality of the host machine 12. The structure and functionality of each computing device 14 allows restaurant professionals to record, via the configuration signals (arrow 11) of FIG. 1, their own menu-specific food selection options into the first database 32. Likewise, the various wines populating their particular wine list can be entered into the second database 34.

Each restaurant's food and wine menus are, for the most part, unique to that particular restaurant or restaurant chain. Therefore, the first and second databases 32 and 34, once populated and numerically scored via the configuration signals (arrow 11 of FIG. 1), can be unique to that particular restaurant. Indeed, even between different restaurants of a given restaurant chain, a particular food item available in all restaurants of that chain may have a slightly different final composition in a particular restaurant. Each restaurant typically employs different chefs or cooks, or different suppliers, all of which can introduce subtle variation into the composition of the prepared dish. A manager or sommelier may therefore customize their DBMS 15 to closely match the actual food as it is actually prepared in their establishment, as opposed to the general guidelines of the chain, thus fine tuning the food and wine pairings that are ultimately generated.

First and second databases 32 and 34 contain respective category blocks B1 and B2. In one possible embodiment, blocks B1 may include categories which a designated user may score via configuration signals (arrow 11 of FIG. 1) for each menu item recorded in the first database 32. For instance, a pull-down menu may be provided with a calibrated score range of (1-10) or any other suitable range.

Example categories for the first database 32 may include, in a particular embodiment, Course Type (CT) 40, Sugar Content (SC) 42, Food Density (D) 43, Flavor Intensity (FI) 44, Acidity (A) 45, Heat/Spice Content (H) 46, Fat Content (F) 47, Savory Content (SC) 48, Astringency (AST) 49, Food Sales Priority (FSP) 55, and/or Manual Override Pairing (MOP) 56. Additional information 57 may include, for example, nutritional information, the dish image for presentation via the image 25, etc.

In an illustrative example, a Course Type (CT) 40 may include Amuse-Buche (0), Early Cheese (0), Appetizers (1), Salad (3), Soup (4), Entrée Salad (5), Sandwich (6), Entrée (8), Desserts (10), and Late Cheese (10). The numbers indicated in parenthesis may be recorded by a designated user via the configuration signals (arrow 11 of FIG. 1) and then locked as to other users to prevent inadvertent changes to the DBMS 15 of FIG. 1. Likewise, each of the other categories such as Sugar Content (SC) 42 may be assigned a value within a calibrated range, e.g., (1-10) in staying with the above example.

Blocks B2 for the second database 34 may include any or all of the following example categories: Wine Type (WT) 60, Format (FM) 61, Producer (PR) 62, Appellation (AP) 63, Vintage (V) 64, Weight (W) 65, Residual Sugar (RS) 66, Alcohol (ALC) 67, Acidity (PH) 68, Fruitiness (F) 69, Earthiness (E) 70, and Tannins (T) 71. Additional blocks B2, not shown for simplicity, may include varietals (VAR), Taster Scores (TS), Sale Price by Glass (SPG), Sale Price by Bottle (SPB), Wine Price Range (WPR), Sales Focus (SF), Taster Description (TD), and Wine Producer's URL (URL).

For instance, Wine Type (WT) 60 may include Sparkling White (0), Sparkling Rose (1), Still White (2), Still Rose (3), Red (4), Dessert White (5), Dessert Red (6), etc. Again, the numbers in parenthesis may be selected via the configuration signals (arrow 11 of FIG. 1) and subsequently locked. Each category may have a drop-down menu to facilitate objective scoring, e.g., Weight (W), with a drop-down score of (1) being "less viscous" and (10) being "most viscous" relative to other wines available in the wine list, or relative to other wines in the universe of available wines. Residual Sugar (RS) may have an assigned score of (1) being "least sweet" and (10) being "most sweet", e.g., a late harvest or ice wine.

Other fields such as Format (FM) may correspond to the option of consuming the wine by the glass, by the bottle, or by the half bottle. Producer (PR) and Appellation (AP) may include the text name and/or other defining graphics of the producer and appellation, respectively, and Vintage (V) may include the numeric entry of the year of vintage. The category of Varietals (VAR) may allow a user to select from a drop down menu from a list of available varietals, e.g., Albarino, Pinot Blanc, Merlot, Dolcetto, etc. Other embodiments may be envisioned, such as a larger or smaller score range and/or other categories, without departing from the intended inventive scope.

Taster Score (TS) may include text notes and the taster's initials or abbreviated comments, e.g., "94 points—RP". Price information could be a numerical entry, e.g., $6 a glass or $25 a bottle. Wine Price Range (WPR) could be assigned a value from a drop-down menu as noted above, e.g., shoe string budget (1), good value (3), middle-of-the-road (5), above average (7), and unlimited (10). Sales Focus (SF) may be used to optionally assign a priority to sales, e.g., low priority, average priority, and high priority, in the event a manager or owner of an establishment would like to emphasize a particular wine. Such a field may be useful in prioritizing a recommendation between closely scored suggestions.

Once a user enters their dining menu selections (arrow 21), possibly including the order of consumption, the CPU 22 processes the selections (arrow 21) and information (arrow 35) from the databases 32 and 34 using objective comparative pairing logic to calculate the PCS value. The computing device 14 thereafter presents the recommended food and wine pairing (arrow 51), i.e., displays or otherwise presents the corresponding recommended wine or wines. This may occur via the display screen 20 as text and/or as image 25, for instance a photograph or artistic rendering of the label, images of the actual vineyard, and/or as text, with or without accompanying descriptive data, a URL link, or other descriptive information. The URL link option enables an establishment using a wireless router or access point to allow patrons to link to the web page of the producer of a particular wine over the Internet to conduct additional research into the recommended wine.

Referring to FIG. 3 in conjunction with the structure of FIG. 1, an example method 100 is shown for pairing food items from a food menu with wine from a wine menu using the system 10 as described above. As noted above, the DBMS 15 of FIG. 1 is initially populated with a first plurality of numerically-scored categories for each food item in the food menu, and with a second plurality of numerically-scored categories for each wine in the wine menu. The computing device 14 or multiple such devices are placed in wireless networked communication with the host machine 12 such that the numerically-scored categories are replicated or otherwise copied or provided on the computing device 14.

Beginning with step S102, after a user has been handed a computing device 14 as shown in FIG. 2, for instance upon being seated at a restaurant, the user browses the various menu options from a food menu. The menu may be interactively presented via the display 20 in some embodiments. When the user has decided on a food course or multiple courses from the food menu, this information is received via the computing device 14 as the selections (arrow 21). The computing device 14 records the selections (arrow 21) in memory 24.

Once recorded in memory 24 at step S102, the CPU 22 executes step S104, wherein the first database 32 is accessed to quantify the menu selections (arrow 21) with respect to each of the wines in the second database 34 using a plurality of comparative categories e.g., using the categories described above.

Step S104 includes calculating via the computing device 14, for each wine in the wine menu, a set of solutions to a plurality of comparison functions. This may occur without communicating with the host machine 12 after receiving the food selection signal (arrow 21). Each of the functions compares one of the first plurality of numerically-scored categories for one or more food items to one of the second plurality of numerically-scored categories for the particular wine.

For instance, the computing device 14 may use each of the following ten absolute value comparison functions in one embodiment:

$$\text{Weight Comparison} = |D-W| \quad (1)$$

$$\text{Course Type/Weight Comparison} = |CT-W| \quad (2)$$

$$\text{Acidity Comparison} = |A-PH| \quad (3)$$

$$\text{Sugar Comparison} = |S-RS| \quad (4)$$

$$\text{Spice/Sugar Comparison} = |H-RS| \quad (5)$$

$$\text{Fat/Tannin Comparison} = |F-T| \quad (6)$$

$$\text{Price Comparison} = |WPR-UPR| \quad (7)$$

$$\text{Savory/Fruity Comparison} = |SC-FR| \quad (8)$$

$$\text{Flavor Intensity/Residual Sugar Comparison} = |FI-RS| \quad (9)$$

$$\text{Fat/Acidity Comparison} = |F-PH| \quad (10)$$

The method 100 proceeds to step S106 when the above comparison functions (1-10) have been computed by the computing device 14 for each wine contained in the second database 34.

At step S106, the device 14 calculates a PCS value for each wine in the wine list as a function of the set of solutions, for instance as a function of the ten comparison functions listed above:

If (CT)≦1 and (WT)≦3 and (UFM)=(FM), then Sum of Functions (1-5, 7, and 10)=PCS; ELSE return (MOP) as the recommendation (arrow 51).

If 5≦(CT)≦6 and 2≦(WT)≦4 and (UFM)=(FM), then Sum of Functions (1-5, 7, and 10)=PCS; ELSE return (MOP) as the recommendation (arrow 51).

If (CT)=8 and (WT)≦4 and (UFM)=(FM), then Sum of Functions (1-8 and 10)=PCS; ELSE return (MOP) as the recommendation (arrow 51).

If (CT)=10 and 5≦(WT)≦6 and (UFM)=(FM), then Sum of Functions (3+4+7+8)=PCS; ELSE return (MOP) as the recommendation (arrow 51).

In the above equations, (UFM) is the user preferred format, e.g., a glass of wine versus a bottle. The method 100 proceeds to step S108 once a PCS value has been calculated for each wine in the second database 34.

At step S108, wines having the lowest PCS values from step S106 may be automatically rank-ordered, with a predetermined threshold PCS value or values representing the optimum pairing, e.g., the lowest PCS value or values. The recommended wine(s) are then presented as image 25 and/or text to the user of the computing device 14.

In another embodiment which may be complementary to the above approach, a user may filter the results using a personal preference. For instance, at any part of the process the user of computing device 14 may select a user preferred format (UFM) such as bottle, half bottle, or glass, with the computing device 14 removing wines having PCS values not matching the UFM.

A user also may be prompted to select a style or styles, e.g., Sparkling White (0), Sparking Rose (1), etc., as set forth above. The computing device 14 next sorts the PCS values to return only the selected style(s). An additional selection menu may be presented depending on the selections made in the above steps.

For instance, if the selection is Sparkling White (0), Sparkling Rose (1), Still White (2), or Still Rose (3), the next selection box presented may be "Dry", "Off-Dry", or "Sweet", with each having a corresponding score, e.g., Dry=RS≦2, Semi-Dry=3≦RS≦4, and Sweet=RS≧5. If the selection is "Dry", the next selection box may be "Light & Crisp" (PH≧6) or "Rich & Full" (PH<6).

If a selection is "Off-Dry", the next selection box could be "Ripe & Fruity" (F≧5) or "Earthy/Minerally" (E≧5). If a selection is "Sweet", the next selection box may be "Slightly Sweet", "Moderately Sweet", or "Very Sweet". Other options exist, e.g., sorting Reds by "Fruit Forward" or "Earthy", etc., as will be understood by those of ordinary skill in the art.

A final selection box (Max Price) may be populated with the corresponding prices of the wines remaining after filtering by the user. This feature allows a user to price sort, and thus narrow a recommendation to those wines that are within the user's budget.

While the best modes for carrying out the invention have been described in detail, those familiar with the art to which this invention relates will recognize various alternative designs and embodiments for practicing the invention within the scope of the appended claims.

The invention claimed is:

1. A system for pairing food from a food menu with wine from a wine menu, the system comprising:
  a host machine having:

a first database describing, via a first plurality of numerically-scored categories, each of a plurality of different food items in the food menu; and a second database describing, via a second plurality of numerically-scored categories, each of a plurality of different wines in the wine menu;

wherein the host machine is configured to receive a set of configuration signals from an administrator for populating or updating the first and second databases; and a computing device in networked communication with the host machine, wherein the computing device has access to information in the first and second databases, and includes a display screen, wherein the computing device is configured to:

receive, via the display screen, a food selection signal corresponding to at least one food item in the food menu;

calculate, via the computing device only after receiving the food selection signal, a set of solutions to a plurality of absolute value comparison functions for each wine in the wine menu, with each of the absolute value comparison functions calculating the absolute value of the difference between one of the first plurality of numerically-scored categories for the at least one food item and a corresponding one of the second plurality of numerically-scored categories for each wine, including a plurality of: Weight Comparison, Course Type/Weight Comparison, Acidity Comparison, Sugar Comparison, Spice/Sugar Comparison, Fat/Tannin Comparison, Price Comparison, Savory/Fruity Comparison, Flavor Intensity/Residual Sugar Comparison, and Fat/Acidity Comparison;

calculate a numeric Pairing Compatibility Score (PCS) value for each wine in the wine list with the food selection indicated via the food selection signal as a function of the set of solutions, wherein the function includes the sum of the absolute values of a plurality of the absolute value comparison functions;

rank-order the numeric PCS values; and display, via the display screen of the computing device, a wine from the wine menu having a threshold PCS value.

2. The system of claim 1, wherein the computing device is a tablet computer having a touch screen, as the display screen, that is configured to receive the food selection signal.

3. The system of claim 1, wherein the computing device includes memory, and is configured to replicate the first and second databases from the host machine in memory of the computing device whenever the first and second databases is changed at the host machine via the configuration signals.

4. The system of claim 1, wherein the computing device is configured to interactively display the food menu via the display screen.

5. The system of claim 1, wherein the computing device is configured to display, via the display screen, an image of the wine having the lowest PCS value.

6. The system of claim 1, wherein the first plurality of numerically-scored categories includes a plurality of: course type, sugar content, density, intensity, acidity, heat/spice content, fat content, savory content, and astringency.

7. The system of claim 6, wherein the second plurality of numerically-scored categories includes a plurality of: wine type, producer, appellation, vintage, weight, residual sugar, alcohol, acidity, fruitiness, earthiness, tannins, and varietals.

8. A system for pairing food from a food menu with wine from a wine menu, the system comprising:

a host machine having:

a database management system (DBMS) containing a first plurality of numerically-scored categories for each food item in the food menu, and a second plurality of numerically-scored categories for each wine in the wine menu; and a plurality of computing devices each in wireless networked communication with the host machine, with each of the computing devices having a touch-screen display, wherein each computing device includes a copy of the first and second pluralities of numerically-scored categories, and is configured to:

generate a food selection signal when a user touches an image on the touch screen display corresponding to a food item in the food menu;

calculate, for each wine in the wine menu, a set of solutions to a plurality of absolute value comparison functions in response to the generated food selection signal, wherein each of the absolute value comparison functions calculates the absolute value of a difference between one of the first plurality of numerically-scored categories for the at least one food item and a corresponding one of the second plurality of numerically-scored categories for each wine, the set of solutions including a plurality of: Weight Comparison, Course Type/Weight Comparison, Acidity Comparison, Sugar Comparison, Spice/Sugar Comparison, Fat/Tannin Comparison, Price Comparison, Savory/Fruity Comparison, Flavor Intensity/Residual Sugar Comparison, and Fat/Acidity Comparison;

calculate a numeric Pairing Compatibility Score (PCS) value for each wine in the wine list as a function of the set of solutions solutions, wherein the function includes the sum of the absolute values of a plurality of the absolute value comparison functions;

rank-order the PCS values from lowest to highest; and display, via the touch-screen display, a plurality of the wines having the lowest PCS values relative to all other wines in the wine menu.

9. The system of claim 8, wherein each of the computing devices includes tangible, non-transitory memory and is configured to automatically replicate the first and second databases in the tangible, non-transitory memory to thereby generate the copies of the first and second databases whenever information in the first and second databases is changed at the host machine via the configuration signals.

10. The system of claim 8, wherein each of the computing device is configured to interactively display the food menu via the touch-screen display.

11. The system of claim 8, wherein each of the computing device is configured to display an image via the touch-screen display describing the plurality of the wines having the lowest PCS values.

12. The system of claim 8, wherein the first plurality of numerically-scored categories includes a plurality of: course type, sugar content, density, intensity, acidity, heat/spice content, fat content, savory content, and astringency.

13. The system of claim 8, wherein the second plurality of numerically-scored categories includes a plurality of: wine type, producer, appellation, vintage, weight, residual sugar, alcohol, acidity, fruitiness, earthiness, tannins, and varietals.

14. The system of claim 13, wherein the second plurality of numerically-scored categories includes each of: course type, sugar content, density, intensity, acidity, heat/spice content, fat content, savory content, and astringency.

15. The system of claim 14, wherein the first plurality of numerically-scored categories includes each of: course type, sugar content, density, intensity, acidity, heat/spice content, fat content, savory content, and astringency.

16. A method for pairing food from a food menu with wine from a wine menu, the method comprising:

- populating a database management system (DBMS) of a host machine with a first plurality of numerically-scored categories for each food item in the food menu;
- populating a second plurality of numerically-scored categories for each wine in the wine menu;
- placing a computing device in wireless networked communication with the host machine such that the first and second plurality of numerically-scored categories are provided on the computing device;
- receiving a food selection signal via the computing device which corresponds to at least one food item in the food menu;
- calculating, via the computing device for each wine in the wine menu and without communicating with the host machine after receiving the food selection signal, a set of solutions to a plurality of absolute value comparison functions, each of which calculates the absolute value of the difference between one of the first plurality of numerically-scored categories for the at least one food item and a corresponding one of the second plurality of numerically-scored categories for that particular wine, including calculating each of: a Weight Comparison, a Course Type/Weight Comparison, an Acidity Comparison, a Sugar Comparison, a Spice/Sugar Comparison, a Fat/Tannin Comparison, a Price Comparison, a Savory/Fruity Comparison, a Flavor Intensity/Residual Sugar Comparison, and a Fat/Acidity Comparison;
- calculating a numeric Pairing Compatibility Score (PCS) value for each wine in the wine list as a function of the set of solutions, wherein function includes the sum of the absolute values of a plurality of the absolute value comparison functions;
- rank-ordering the numeric PCS values; and
- displaying, via the display screen, at least the wine from the wine menu having a threshold numeric PCS value.

17. The method of claim 16, wherein the computing device includes tangible, non-transitory memory, the method further comprising: automatically replicating the first and second databases in the tangible, non-transitory memory of the computing device whenever the first and second databases are modified at the host machine via a set of configuration signals.

18. The method of claim 16, wherein the first plurality of numerically-scored categories includes course type, sugar content, density, intensity, acidity, heat/spice content, fat content, savory content, and astringency, and wherein the second plurality of objectively scored categories includes wine type, producer, appellation, vintage, weight, residual sugar, alcohol, acidity, fruitiness, earthiness, tannins, and varietals.

* * * * *